(12) United States Patent
Fear

(10) Patent No.: US 11,130,055 B2
(45) Date of Patent: Sep. 28, 2021

(54) SYSTEM AND METHOD FOR GRANTING REMOTE ACCESS TO A VIDEO GAME EXECUTED ON A VIDEO GAME CONSOLE OR NETWORK CLIENT

(71) Applicant: Nvidia Corporation, Santa Clara, CA (US)

(72) Inventor: Andrew Fear, Austin, TX (US)

(73) Assignee: Nvidia Corporation, Santa Clara, CA (US)

( * ) Notice: Subject to any disclaimer, the term of this patent is extended or adjusted under 35 U.S.C. 154(b) by 327 days.

(21) Appl. No.: 14/698,163

(22) Filed: Apr. 28, 2015

(65) Prior Publication Data
US 2015/0238859 A1 Aug. 27, 2015

Related U.S. Application Data

(63) Continuation-in-part of application No. 14/017,695, filed on Sep. 4, 2013.

(51) Int. Cl.
| | |
|---|---|
| *A63F 13/00* | (2014.01) |
| *A63F 13/355* | (2014.01) |
| *A63F 13/35* | (2014.01) |
| *A63F 13/45* | (2014.01) |
| *A63F 13/30* | (2014.01) |
| *H04N 7/15* | (2006.01) |

(52) U.S. Cl.
CPC ............ *A63F 13/355* (2014.09); *A63F 13/30* (2014.09); *A63F 13/35* (2014.09); *A63F 13/45* (2014.09); *A63F 2300/5533* (2013.01); *H04N 7/155* (2013.01)

(58) Field of Classification Search
CPC ...... A63F 13/355; A63F 13/352; A63F 13/12; A63F 13/30; A63F 13/77
See application file for complete search history.

(56) References Cited

U.S. PATENT DOCUMENTS

| | | | | |
|---|---|---|---|---|
| 5,393,070 A | * | 2/1995 | Best ...................... | A63F 13/005 463/35 |
| 6,921,336 B1 | * | 7/2005 | Best ........................ | A63F 13/10 463/32 |
| 6,966,837 B1 | * | 11/2005 | Best ....................... | A63F 13/10 463/33 |
| 7,497,776 B1 | | 3/2009 | Roman | |

(Continued)

OTHER PUBLICATIONS

Fu, Hsin-Chia, et al., "Interactive Video Platform for E-Learning and Remote Services"; International Journal of omputer Science Issues, vol. 10, Issue 1, No. 1, pp. 154-161; Jan. 2013.

*Primary Examiner* — Omkar A Deodhar
*Assistant Examiner* — Eric M Thomas

(57) ABSTRACT

Systems for granting remote access to, and methods of playing, a video game executing on a video game console coupled to a computer network or video games executing on hosting clients of a computer network. One embodiment of the system includes: (1) a stream distributor configured to receive a video stream conveying a view of a gamespace of the video game from the video game console via the computer network and transmit the video stream toward a remote client via the computer network and (2) a response receiver associated with the stream distributor and configured to receive a response stream from the remote client via the computer network and transmit the response stream toward the video game console.

14 Claims, 3 Drawing Sheets

(56) References Cited

U.S. PATENT DOCUMENTS

| | | |
|---|---|---|
| 8,012,025 B2 | 9/2011 | Hillis et al. |
| 8,490,012 B2 | 7/2013 | Marinkovich et al. |
| 8,650,494 B1 | 2/2014 | Sampath et al. |
| 8,834,277 B2 * | 9/2014 | Perry ................... A63F 13/63 463/42 |
| 9,158,746 B2 | 10/2015 | Bartek et al. |
| 9,280,529 B2 | 3/2016 | Lemonik et al. |
| 9,398,086 B2 | 7/2016 | Su et al. |
| 9,421,455 B1 | 8/2016 | Connor et al. |
| 9,616,341 B2 | 4/2017 | Connor et al. |
| 9,987,561 B2 | 6/2018 | Huang et al. |
| 2002/0169617 A1 | 11/2002 | Luisi |
| 2003/0199319 A1 | 10/2003 | Culbert |
| 2005/0003330 A1 | 1/2005 | Asgarinejad et al. |
| 2005/0227766 A1 | 10/2005 | Kaminagayoshi |
| 2005/0272505 A1 | 12/2005 | Okamura |
| 2006/0005240 A1 | 1/2006 | Sundarrajan et al. |
| 2006/0282774 A1 | 12/2006 | Covell et al. |
| 2008/0158232 A1 | 7/2008 | Shuster |
| 2008/0207322 A1 | 8/2008 | Mizrani |
| 2008/0263460 A1 | 10/2008 | Alberg et al. |
| 2008/0278448 A1 | 11/2008 | Nilsagard et al. |
| 2009/0112906 A1 * | 4/2009 | Shuster ................... A63F 13/12 |
| 2009/0249224 A1 | 10/2009 | Davis et al. |
| 2009/0259948 A1 | 10/2009 | Hamilton, II et al. |
| 2010/0045697 A1 | 2/2010 | Reville et al. |
| 2010/0070859 A1 | 3/2010 | Shuster et al. |
| 2010/0138432 A1 | 6/2010 | Noyes |
| 2010/0142447 A1 | 6/2010 | Schlicht et al. |
| 2010/0273553 A1 * | 10/2010 | Zalewski ............ H04N 21/235 463/31 |
| 2010/0303444 A1 | 12/2010 | Sasaki et al. |
| 2011/0022673 A1 | 1/2011 | Lueth et al. |
| 2011/0078246 A1 | 3/2011 | Dittmer-Roche |
| 2011/0086706 A1 | 4/2011 | Zalewski |
| 2011/0122063 A1 | 5/2011 | Periman et al. |
| 2011/0223994 A1 | 9/2011 | Yerli |
| 2012/0030563 A1 | 2/2012 | Lemonik et al. |
| 2012/0102418 A1 | 4/2012 | Joy et al. |
| 2012/0110443 A1 | 5/2012 | Lemonik et al. |
| 2012/0184373 A1 | 7/2012 | Kim et al. |
| 2012/0252580 A1 | 10/2012 | Dugan |
| 2012/0278731 A1 | 11/2012 | Marinkovich et al. |
| 2013/0079132 A1 | 3/2013 | Archer et al. |
| 2013/0084985 A1 | 4/2013 | Green et al. |
| 2013/0106989 A1 | 5/2013 | Gage et al. |
| 2013/0198273 A1 * | 8/2013 | Vago ................... H04L 67/42 709/203 |
| 2013/0227437 A1 | 8/2013 | Brody et al. |
| 2013/0244794 A1 | 9/2013 | Yahiro |
| 2013/0260892 A1 | 10/2013 | Ikeda |
| 2013/0339847 A1 | 12/2013 | Bartek et al. |
| 2013/0344960 A1 * | 12/2013 | Perry ................... A63F 13/12 463/32 |
| 2014/0033067 A1 | 1/2014 | Pittenger et al. |
| 2014/0047027 A1 | 2/2014 | Moyers |
| 2014/0143672 A1 | 5/2014 | Kim et al. |
| 2014/0173462 A1 | 6/2014 | Mattingly et al. |
| 2014/0208163 A1 | 7/2014 | Domke et al. |
| 2014/0349763 A1 * | 11/2014 | Lanzoni ................ A63F 13/323 463/42 |
| 2015/0067745 A1 | 3/2015 | Fear |
| 2015/0080123 A1 | 3/2015 | Motokura et al. |
| 2015/0149404 A1 | 5/2015 | Lock et al. |
| 2015/0157928 A1 | 6/2015 | Hall et al. |
| 2015/0238875 A1 | 8/2015 | Fear |
| 2015/0256594 A1 | 9/2015 | Nancke-Krogh |
| 2015/0269858 A1 | 9/2015 | Laine et al. |
| 2015/0304605 A1 | 10/2015 | Hartman et al. |
| 2015/0321098 A1 | 11/2015 | van der Laan et al. |
| 2015/0372845 A1 | 12/2015 | Yoshimochi |
| 2015/0375117 A1 | 12/2015 | Thompson et al. |
| 2016/0044073 A1 | 2/2016 | Rosenberg |
| 2016/0158653 A1 | 6/2016 | Fear |
| 2016/0170616 A1 | 6/2016 | Rosenberg |
| 2016/0287988 A1 | 10/2016 | Huang et al. |
| 2016/0287996 A1 | 10/2016 | Huang et al. |
| 2016/0294899 A1 | 10/2016 | Huang et al. |
| 2016/0375363 A1 | 12/2016 | Connor et al. |
| 2017/0080340 A1 | 3/2017 | Dugan |
| 2019/0230138 A1 | 7/2019 | Lee |
| 2019/0392028 A1 | 12/2019 | Ryan et al. |

* cited by examiner

SYSTEM AND METHOD FOR GRANTING REMOTE ACCESS TO A VIDEO GAME EXECUTED ON A VIDEO GAME CONSOLE OR NETWORK CLIENT

CROSS-REFERENCE TO RELATED APPLICATION

This application is a continuation-in-part of U.S. patent application Ser. No. 14/017,695, filed by Fear on Sep. 4, 2013, entitled "System and Method for Providing Real-Time Assistance Regarding a Cloud-Based Application," commonly assigned with this application and incorporated herein by reference.

TECHNICAL FIELD

This application is directed, in general, to video gaming and, more specifically, to a system and method for granting remote access to a video game executed on a network client.

BACKGROUND

Over the last several decades, video gaming has become wildly popular. Consumers use a variety of general-purpose computers, such as desktop and laptop personal computers and smartphones, for video gaming. Video game consoles, such as home video game consoles, handheld video game consoles, microconsoles and dedicated consoles, have also come into wide use.

While some people enjoy single-player gaming, multi-player (typically competitive) video gaming is particularly popular, probably due to the acute interpersonal dynamic. In a typical scenario, a person who has a general-purpose computer or a video game console asks at least one other person to join him in playing a video game. The two or more players then take an input device, which may be a portion of a keyboard or more likely a game controller, and play the video game "locally," typically while sitting or standing next to one another. Many millions of copies of general-purpose computer games, and many millions of video game consoles have been sold, proving the popularity and efficacy of modern gaming platforms.

SUMMARY

One aspect provides a system for granting remote access to a video game executing on a video game console coupled to a computer network. One embodiment of the system includes: (1) a stream distributor configured to receive a video stream conveying a view of a gamespace of the video game from the video game console via the computer network and transmit the video stream toward a remote client and (2) a response receiver associated with the stream distributor and configured to receive a response stream from the remote client via the computer network and transmit the response stream toward the video game console.

Another aspect provides a system for granting remote access to video games executing on hosting clients of a computer network. In one embodiment, the system includes: (1) a remote play coordinator configured to transmit data regarding opportunities to play the video games toward remote clients and receive data from the remote clients indicating elections to play the video games, (2) a stream distributor associated with the remote play coordinator and configured to receive video streams conveying views of gamespaces of the video games from hosting clients via the computer network and transmit the video streams toward the remote clients via the computer network and (3) a response receiver associated with the stream distributor and configured to receive response streams from the remote clients via the computer network and transmit the response streams toward the hosting clients.

Yet another aspect provides a method of playing a video game on a video game console. In one embodiment, the method includes: (1) receiving into at least one server in the computer network a video stream conveying a view of a gamespace of the video game from the video game console, (2) transmitting the video stream from the at least one server toward a remote client via the computer network, (3) receiving into the at least one server a response stream from the remote client via the computer network and (4) transmitting the response stream from the at least one server toward the video game console.

Still another embodiment provides a method of playing video games on hosting clients of a computer network. In one embodiment, the method includes: (1) transmitting data regarding opportunities to play the video games toward remote clients, (2) receiving data from the remote clients indicating elections to play the video games, (3) receiving video streams conveying views of gamespaces of the video games from hosting clients via the computer network, (4) transmitting the video streams toward the remote clients via the computer network, (5) receiving response streams from the remote clients via the computer network and (6) transmitting the response streams toward the hosting clients.

BRIEF DESCRIPTION

Reference is now made to the following descriptions taken in conjunction with the accompanying drawings, in which.

DETAILED DESCRIPTION

Figure 1:
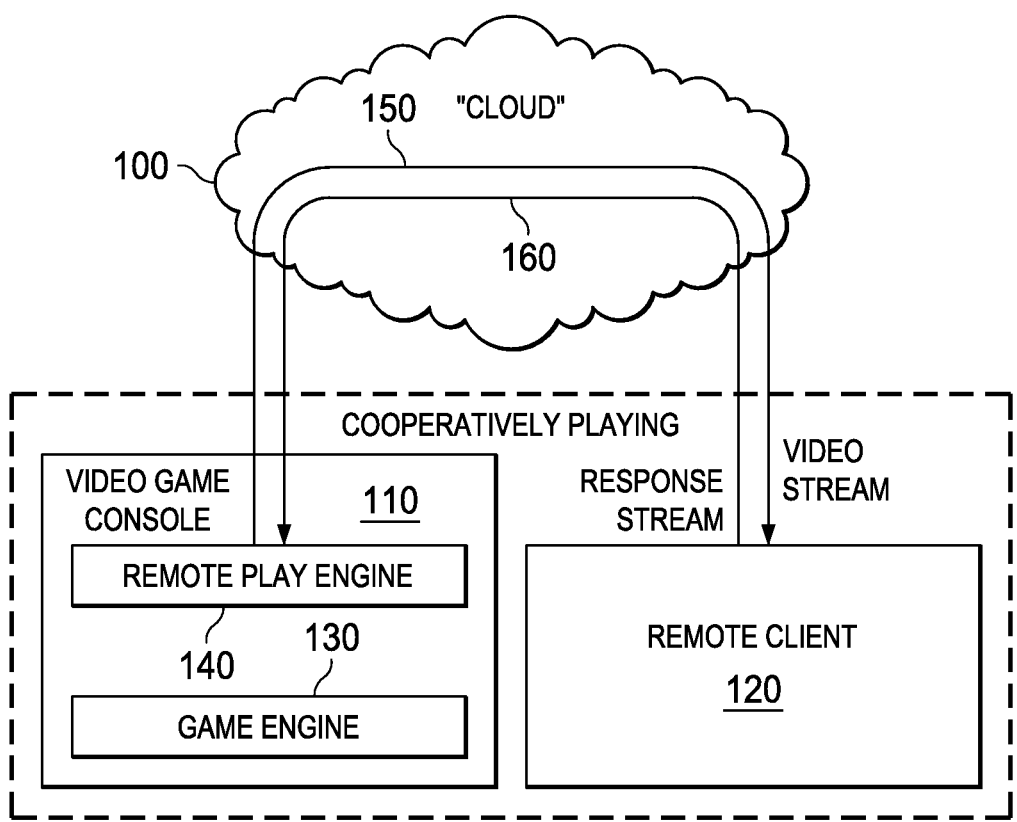
FIG. 1 is a diagram of one embodiment of a computer network including a cloud of data processing and storage resources and at least two clients, together with one embodiment of a system for granting remote access to a video game executing on a video game console.

As stated above, multi-player video gaming involving a video game hosted on a person's general-purpose computer or video game console has, to this point in time, required the players playing the video game to be physically proximate one another so they could use an input device that was part of the computer or console ("local" to the computer or console). Of course, cloud gaming allows players who are remote to one another to play a game hosted "in the cloud," but that is of no relevance to the millions of video games hosted on general-purpose computers and video game consoles located in people's homes or businesses.

The term, "video game console," is defined herein as a console machine primarily designed for consumers to use for playing a video game, in which a video game is executed, a gamespace is created and a video signal or visual image is produced to display a view of the gamespace. Because a "video game console" is primarily designed for consumers and for playing video games, commercial arcade machines and general purpose computers, such as personal computers and laptop computers and smartphones, are excluded from the definition. Modern Video game consoles include home video game consoles (that typically allow various video games to be loaded by cartridges or discs), handheld video game consoles and microconsoles (that typically allow various video games to be loaded by wireless connection) and dedicated consoles (that come with one or more preloaded video games and typically do not accommodate additional video games).

It is realized herein that many of today's general-purpose computers and video game consoles may be made clients of a computer network, such as the Internet, by a wireline or wireless coupling. However, as those skilled in the pertinent art are aware, this capability has only been exploited to date to enable either: (1) cloud-based gaming or (2) multi-player gaming in which a copy of the same game is hosted on each of the computers or consoles, and the computer network is used to share data or allow the players to communicate with each other.

It is further realized herein that the computer network may be employed to transmit a stream bearing the video output of a general-purpose computer or video game console to one or more remote clients. It is yet further realized that the computer network may be further employed to transmit a stream bearing responses from the one or more remote clients back to the general-purpose computer or video game console. It is yet still further realized that a system to effect such use of a computer network may be embodied in software, firmware or hardware in a general-purpose computer, a video game console, one or more servers in the computer network, or a combination of these. It is still yet further realized that, should the system be embodied in one or more servers, the system may handle video and response streams corresponding to multiple games hosted on multiple corresponding general-purpose computers or video game consoles coupled to the computer network as clients. It is further realized that such server-based system may further serve to coordinate players who are remote from one another, namely to make players aware of opportunities to play games on other players' computers or consoles and allow the players to elect to take advantage of the opportunities.

Accordingly, introduced herein are various embodiments of systems for granting remote access to, and methods of playing, a video game executing on a video game console coupled to a computer network or video games executing on hosting clients of a computer network. In general, the systems and methods make use of a computer network to allow remote players to play computer games without requiring them to be proximate the general-purpose computer or video game console that is hosting the computer game (i.e. within reach of an input device that is part of the computer or console hosting the computer game), also known as "local" to the computer or console.

FIG. 1 is a diagram of one embodiment of a computer network including a computer network, i.e. a cloud 100, of data processing and storage resources and at least two clients, together with one embodiment of a system for granting remote access to a video game executing on a video game console. FIG. 1 shows a video game console 110 and a remote client 120. In the embodiment of FIG. 1, the video game console 110 is a video game console. In one embodiment, the remote client 120 is a general-purpose computer. In another embodiment, the remote client 120 is a mobile device. In yet another embodiment, the remote client 120 is another video game console.

The video game console 110 includes data processing and storage circuitry (not shown) configured to execute video game software (not shown) to bring into being a video game. The data processing and storage circuitry, together with the video game software, is shown in FIG. 1 collectively as a game engine 130. The video game software configures the game engine 130 to generate a gamespace within which multiple players play a game. The gamespace may represent, for example, a two-dimensional maze or a three-dimensional landscape. Avatars, which may be characters or objects of various types, populate the gamespace. The multiple players are usually assigned corresponding character avatars and usually interact with each other and the object avatars while playing the video game.

As those skilled in the art understand, the multiple players play the video game by responding to stimuli in the gamespace. Accordingly, the video game console 110 includes multiple input devices for accepting responses by multiple players. While the input devices are not shown in FIG. 1, they are conventional and may include a keyboard, a mouse, a joystick, a yoke, buttons of various types, switches, pedals, touchscreens or any other conventional input device. Later-developed input devices may also be employed in the video game console 110 without departing from the scope of the invention.

The video game console 110 further includes video stream generating hardware (and sometimes also software) (not shown) configured to generate a view of the gamespace that takes the form of a video stream 150 (i.e. a progressive sequence of video frames at a given frame rate). The frame rate is sufficiently high to make motion appear continuous to humans viewing the video stream 150, which those skilled in the pertinent art consider to require at least 16 frames per second. In the embodiment of FIG. 1, the frame rate is at least 18 frames per second. In various embodiments, the frame rate is about 30 frames per second. An audio stream is typically joined to the video stream 150 and delivered to a monitor, which may be a computer monitor, a video projector, a television set or other video display in a conventional manner. (The term "video stream" will be used generically herein to encompass not only a video stream that includes an audio stream, but also a video stream that does not include an audio stream.)

The video game console 110 further includes a system for granting remote access to the video game hosted by the video game console 110 that takes the form of a remote play engine 140. The remote play engine 140 is generally configured to receive the video stream 150, configure the video stream 150 for transport through the cloud 100 (typically by encapsulating it in packets according to a standard network protocol) and cause the video stream 150 to be transmitted toward the remote client 120 (and, in one embodiment, toward multiple remote clients). The remote play engine 140 is further generally configured to receive a response stream 160 from the remote client 120 via the cloud 100, configure the response stream 160 for delivery to the game engine (typically by removing the response stream 160 from its packets and otherwise adapting it to cause it to appear to have originated in one of the input devices of the video game console 110) and transmit it to the game engine 130 so the video game may take the responses contained in the response stream 160 into account.

In the embodiment of FIG. 1, the remote client 120 need only receive and render the video stream (together with any audio stream that may be included with it. The remote client 120 therefore functions as a video player. Input devices (not shown) of the remote client 120 allow a player using the remote client 120 to provide responses to the game, which the remote client then provides in the form of the response stream 160 to the video game console 110.

Figure 2:
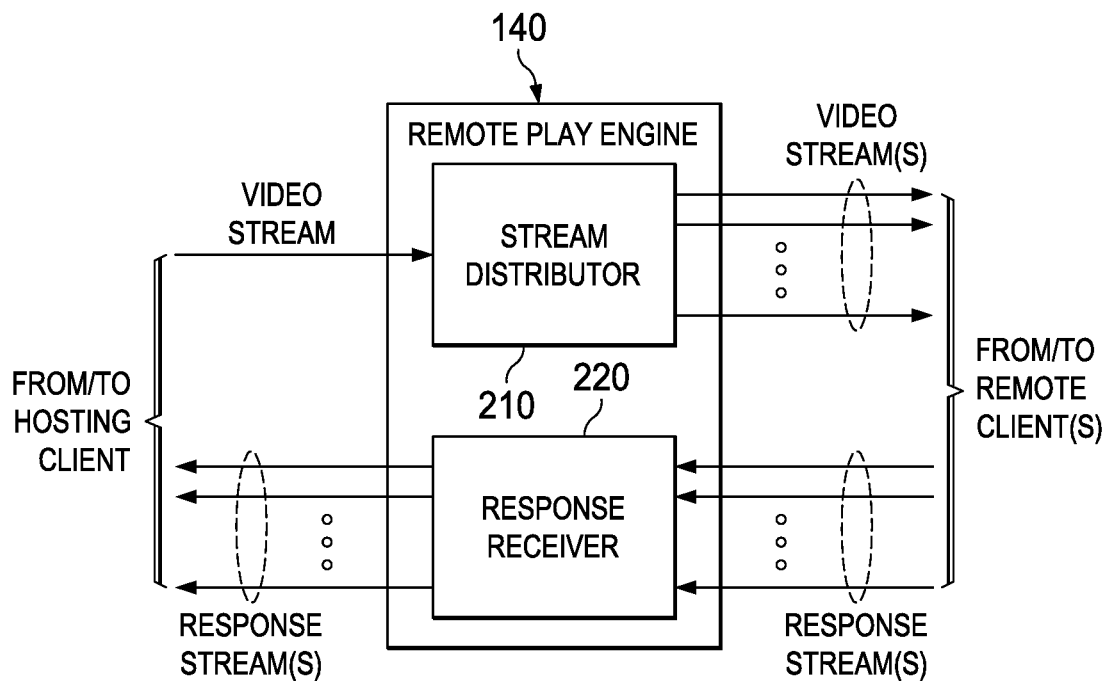
FIG. 2 is a block diagram of one embodiment of the remote play engine of FIG. 1.

FIG. 2 is a block diagram of one embodiment of the remote play engine 140 of FIG. 1. The remote play engine 140 embodiment includes a stream distributor 210. The stream distributor 210 is configured to receive a video stream conveying a view of a gamespace of the video game from the video game console. The stream distributor 210 is further configured to transmit the video stream toward a remote client (e.g., the remote client 120 of FIG. 1) via the computer network (e.g., the cloud 100 of FIG. 1) and, in various embodiments, multicast the video stream to further remote clients to enable three or more players to play the video game hosted on the hosted client 110.

The remote play engine 140 embodiment further includes a response receiver 220. The response receiver 220 is associated with the stream distributor 210. The response receiver 220 is configured to receive a response stream from the remote client (e.g., the remote client 120 of FIG. 1) via the computer network (e.g., the cloud 100 of FIG. 1) and transmit the response stream toward the video game console. In various embodiments, the response receiver is configured to receive multiple response streams from corresponding multiple response clients and transmit them toward the video game console. The game engine 130 of FIG. 1 ultimately receives the response stream or streams and bases further gameplay on the responses contained therein.

Figure 3:
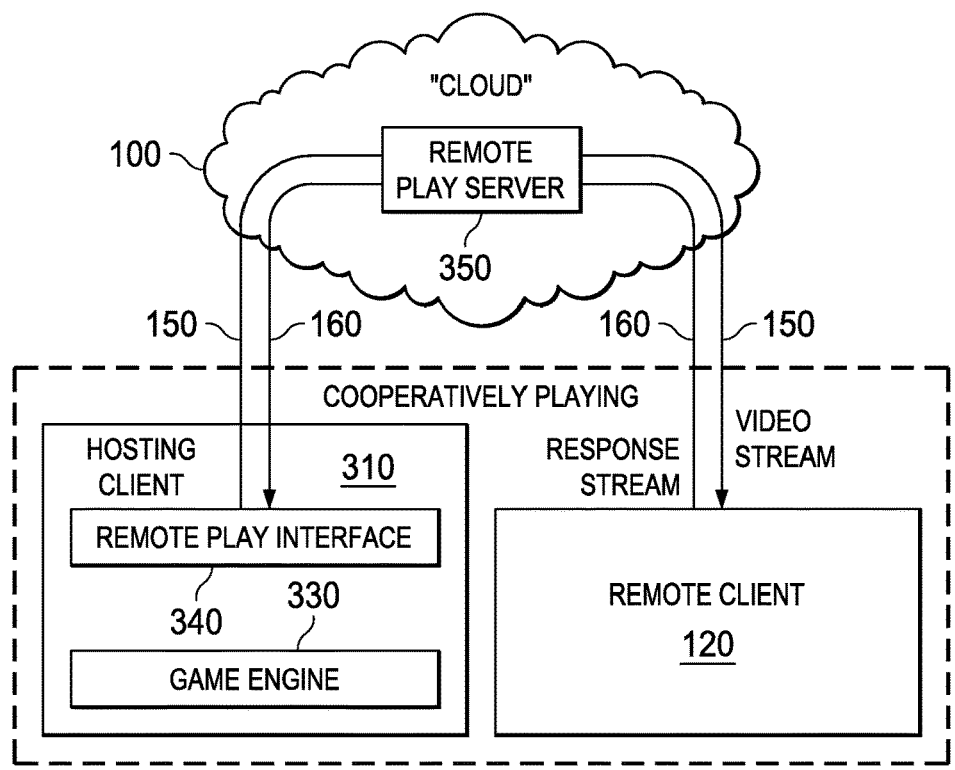
FIG. 3 is a diagram of one embodiment of a computer network including a cloud of data processing and storage resources and at least two clients, together with one embodiment of a system for granting remote access to video games executing on hosting clients of the computer network.

FIG. 3 is a diagram of one embodiment of a computer network including a computer network, i.e. a cloud 100, of data processing and storage resources and at least two clients, together with one embodiment of a system for granting remote access to video games executing on hosting clients of the computer network. FIG. 3 shows a hosting client 310 and a remote client 120. In the embodiment of FIG. 3, the hosting client 310 is a general-purpose computer. In another embodiment, the hosting client 310 is a mobile device. In yet another embodiment, the hosting client 310 is a video game console. In the embodiment of FIG. 3, the remote client 120 is another general-purpose computer. In another embodiment, the remote client 120 is a mobile device. In yet another embodiment, the remote client 120 is a video game console.

The hosting client 310 includes data processing and storage circuitry (not shown) configured to execute software of various kinds, including video game software (not shown) that can bring into being a video game. The data processing and storage circuitry, together with the video game software, is shown in FIG. 3 collectively as a game engine 330. The video game software configures the game engine 330 to generate a gamespace within which multiple players play a game.

As with the video game console 110 of FIG. 1, the multiple players play the video game by responding to stimuli in the gamespace. Accordingly, the hosting client 310 includes multiple input devices for accepting responses by multiple players. While the input devices are not shown in FIG. 3, they are conventional and may include a keyboard, a mouse, a joystick, a yoke, buttons of various types, switches, pedals, touchscreens or any other conventional input device. Later-developed input devices may also be employed in the hosting client 310 without departing from the scope of the invention.

The hosting client 310 further includes video stream generating hardware (and sometimes also software) (not shown) configured to generate a view of the gamespace that takes the form of a video stream 150. As with the embodiment of FIG. 1, the frame rate is sufficiently high such that a sense of motion is conveyed to a human being viewing the video stream 150. In the embodiment of FIG. 3, the frame rate is at least 18 frames per second. In various embodiments, the frame rate is about 30 frames per second. An audio stream is typically joined to the video stream 150 and delivered to a monitor, which may be a computer monitor, a video projector, a television set or other video display in a conventional manner.

The hosting client 310 further includes a portion of a system for granting remote access to the video game hosted by the hosting client 310. The portion takes the form of a remote play interface 340. The remote play interface 340 is generally configured to receive the video stream 150, configure the video stream 150 for transport through the cloud 100 (typically by encapsulating it in packets according to a standard network protocol) and cause the video stream 150 to be transmitted toward a remote play server 350. The remote play interface 340 is further generally configured to receive a response stream 160 from the remote play server 350 via the cloud 100 and configure the response stream 160 for delivery to the game engine (typically by removing the response stream 160 from its packets and otherwise adapting it to cause it to appear to have originated in one of the input devices of the hosting client 310) and transmit it to the game engine 330 so the video game may take the responses contained in the response stream 160 into account.

The remote play server 350 is generally configured to receive the video stream 150 from the hosting client 310 and other video streams from other hosting clients (not shown), cause the video stream 150 to be transmitted toward the remote client 120 and cause the other video streams to be transmitted toward other remote clients (not shown). The remote play server 350 is further generally configured to receive the response stream 160 from the remote client 120 and other response streams from other remote clients (not shown), cause the response stream 160 to be transmitted toward the hosting client 310 and cause the other response streams to be transmitted toward other hosting clients (not shown).

As with the embodiment of FIG. 1, the remote client 120 need only receive and render the video stream 150 (together with any audio stream that may be included with it. The remote client 120 therefore functions as a video player. Input devices (not shown) of the remote client 120 allow a player using the remote client 120 to provide responses to the game, which the remote client then provides in the form of the response stream 160 to the hosting client 310.

Figure 4:
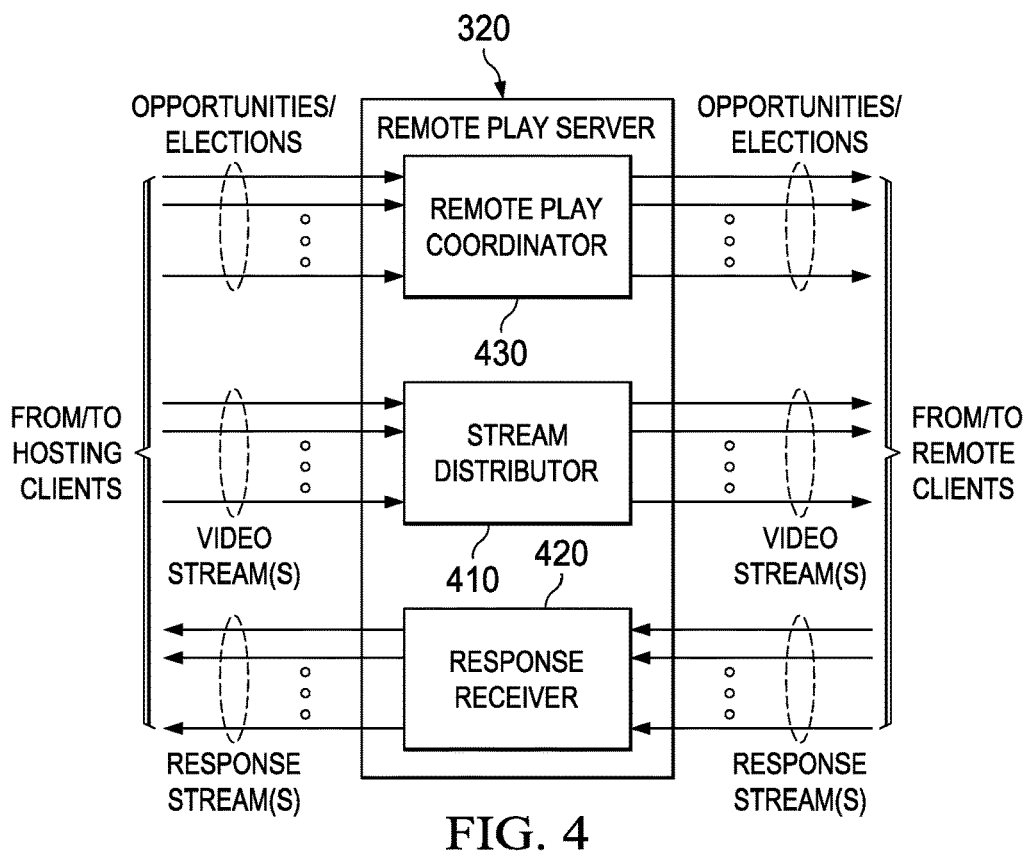
FIG. 4 is a block diagram of one embodiment of the remote play server of FIG. 3.

FIG. 4 is a block diagram of one embodiment of the remote play server 350 of FIG. 3. The remote play server 320 embodiment includes a stream distributor 410. The stream distributor 410 is configured to receive a video stream conveying a view of gamespaces of video games from multiple video game consoles. The stream distributor 410 is further configured to transmit the video streams toward remote clients (e.g., the remote client 120 of FIG. 1) via the computer network (e.g., the cloud 100 of FIG. 1), which may involve unicasting of video streams to single remote clients or multicasting video streams to multiple remote clients, depending upon the number of remote players playing each game.

The remote play server 320 embodiment further includes a response receiver 420. The response receiver 420 is associated with the stream distributor 410. The response receiver 420 is configured to receive a response stream from the remote client (e.g., the remote client 120 of FIG. 1) via the computer network (e.g., the cloud 100 of FIG. 1) and transmit the response stream toward the video game console. In various embodiments, the response receiver is configured to receive multiple response streams from corresponding multiple response clients and transmit them toward the video game console. The game engine 130 of FIG. 1 ultimately receives the response stream or streams and bases further gameplay on the responses contained therein.

The remote play server 320 embodiment further includes a remote play coordinator 430. The remote play coordinator 430 is associated with the stream distributor 410 and the response receiver 420. The remote play coordinator 430 is configured to transmit data regarding opportunities to play the video games toward remote clients. The remote play coordinator 430 is further configured to receive data from the remote clients indicating elections to play the video games.

In one embodiment, the remote play server 320 may function as follows. Various candidate players associated with various remote clients browse the remote play server 320, where they are presented with a list of games they can play on various hosting systems (i.e. opportunities). The candidate players indicate their desire to play particular games (i.e. elections), whereupon the remote play server 320 causes the stream distributor 410 to route video streams corresponding to the selected games to the appropriate remote clients, and further causes the response receiver 420 to route response streams of the remote clients to the appropriate hosting clients.

Figure 5:
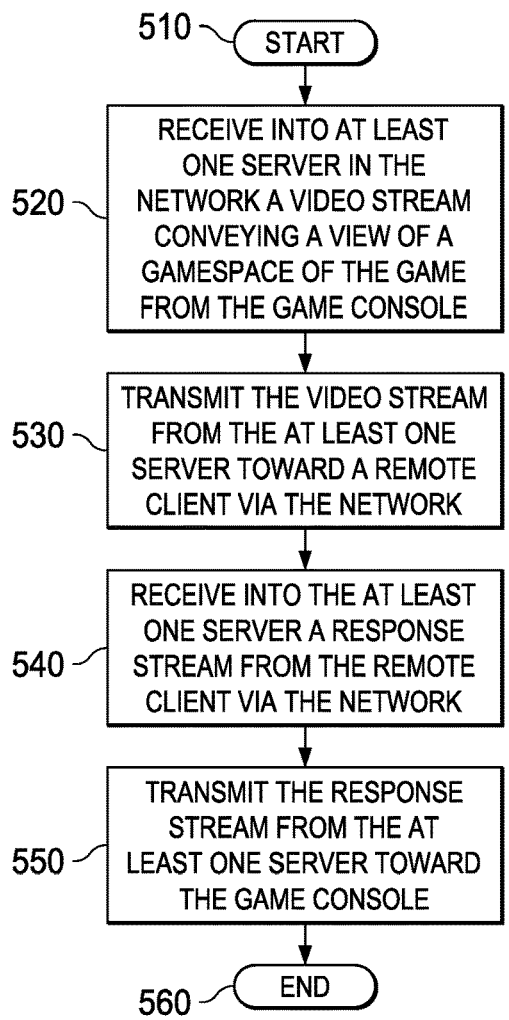
FIG. 5 is a flow diagram of one embodiment of a method of a method of playing a video game on a video game console.

FIG. 5 is a flow diagram of one embodiment of a method of playing a video game on a video game console. The method begins in a start step 510. In a step 520, a video stream conveying a view of a gamespace of the video game is received from the video game console into at least one server in the computer network. In a step 530, the video stream is transmitted from the at least one server toward a remote client via the computer network. In a step 540, a response stream is received into the at least one server from the remote client via the computer network. In a step 550, the response stream is transmitted from the at least one server toward the video game console. The method ends in an end step 560.

Figure 6:
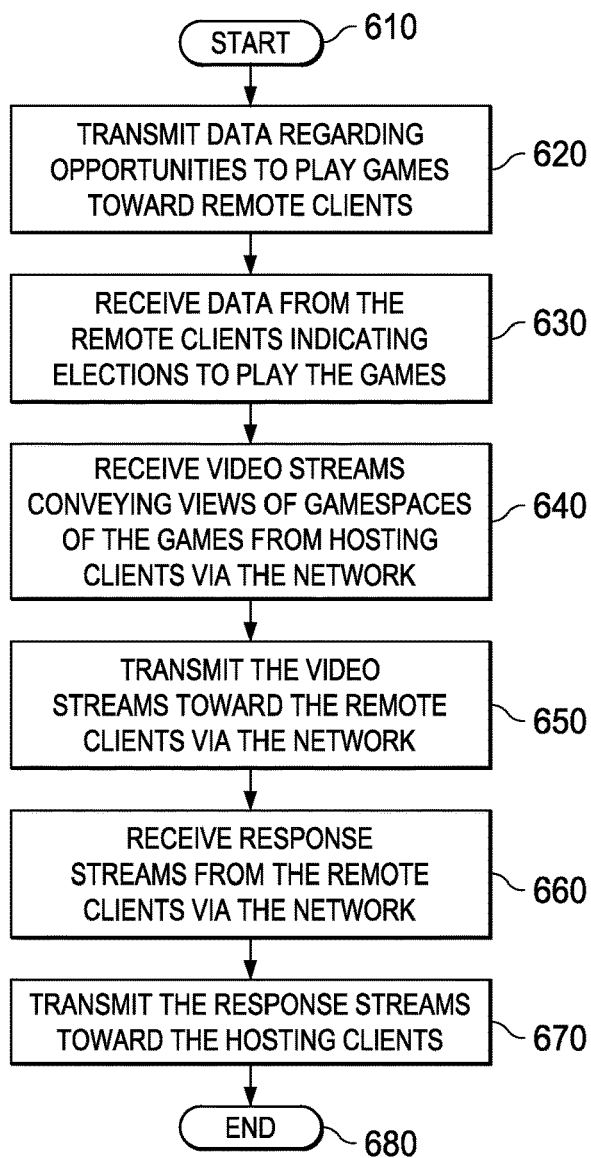
FIG. 6 is a flow diagram of one embodiment of a method of a method of playing video games on hosting clients of a computer network.

FIG. 6 is a flow diagram of one embodiment of a method of playing video games on hosting clients of a computer network. The method begins in a start step 610. In a step 620, data regarding opportunities to play the video games is transmitted toward remote clients. In a step 630, data is received from the remote clients indicating elections to play the video games. In a step 640, video streams conveying views of gamespaces of the video games are received from hosting clients via the computer network. In a step 650, the video streams are transmitted toward the remote clients via the computer network. In a step 660, response streams are received from the remote clients via the computer network. In a step 670, the response streams are transmitted toward the hosting clients. The method ends in an end step 680.

Those skilled in the pertinent art should understand that multi-player games need not be modified to operate with the systems and methods described herein. Therefore, games that are conventional and later-developed for general-purpose computers, mobile devices and video game consoles are fully qualified to take advantage of the capabilities described herein as they are.

Those skilled in the art to which this application relates will appreciate that other and further additions, deletions, substitutions and modifications may be made to the described embodiments.

What is claimed is:

1. A method of multiplayer gaming over a computer network, the method comprising:
receiving, by a hosting client, input provided from multiple remote clients to a remote play coordinator of a remote play server, the input being transmitted to the hosting client from the remote play coordinator, wherein:
the hosting client and multiple remote clients are playing the same game;
the remote play coordinator is connected to the multiple remote clients and the hosting client via the computer network; and
the computer network comprises the Internet;
generating, by a game engine of the hosting client, a video stream conveying a gamespace for the game responsive to the input from the multiple remote clients;
unicasting or multicasting via the computer network, depending on a number of remote clients providing input to the remote play coordinator, the video stream from the hosting client by a stream distributor of the remote play server to the multiple remote clients; and
receiving by the hosting client via the computer network, a response stream from a response receiver of the remote play server, the response stream comprising responses from the multiple remote clients.

2. The method of claim 1, wherein:
the input from the multiple remote clients received by the hosting client from the remote play coordinator is received by a remote play interface of the hosting client; and
the response streams received by the hosting client from the response receiver are received by the remote play interface of the hosting client.

3. The method of claim 1 wherein the stream distributor and response receiver are embodied in the hosting client.

4. The method of claim 1 wherein each of the multiple remote clients are assigned a corresponding avatar and each of the multiple remote clients interact with avatars of others of the multiple remote clients while playing the video game.

5. The method of claim 1 wherein the multiple remote clients are selected from the group consisting of:
a general purpose computer,
a mobile device, and
a video game console.

6. The method of claim 1 wherein the hosting client is selected from the group consisting of:
a general purpose computer,
a mobile device, and
a video game console.

7. The method of claim 1 wherein the video stream has a frame rate of at least 18 frames per second.

8. A system for multiplayer gaming over a computer network, the system comprising:
a hosting client;
multiple remote clients; and
a remote play server connected to the hosting client and the multiple remote clients over the computer network, wherein:

the computer network comprises the Internet;

the hosting client receives input provided from the multiple remote clients to a remote play coordinator of the remote play server, the input being transmitted to the hosting client from the remote play coordinator;

the hosting client and multiple remote clients are playing the same game;

a game engine of the hosting client generates a video stream conveying a gamespace for the game responsive to the input from the multiple remote clients;

the video stream generated by the hosting client is unicasted or multicasted, depending on a number of remote clients providing input to the remote play coordinator, from a stream distributor of the remote play server, via the computer network to the multiple remote clients; and the hosting client, via the computer network, receives a response stream from a response receiver of the remote play server, the response stream comprising responses from the multiple remote clients.

9. The system of claim 8 wherein:

the input from the multiple remote clients received by the host client from the remote play coordinator is received by a remote play interface of the hosting client; and the response streams received by the host client from the response receiver are received by the remote play interface of the hosting client.

10. The system of claim 8 wherein the stream distributor and response receiver are embodied in the hosting client.

11. The method of claim 1 wherein each of the multiple remote clients are assigned a corresponding avatar and each of the multiple remote clients interact with avatars of others of the multiple remote clients while playing the video game.

12. The system of claim 8 wherein the multiple remote clients are selected from the group consisting of:

a general purpose computer, a mobile device, and a video game console.

13. The system of claim 8 wherein the hosting client is selected from the group consisting of:

a general purpose computer, a mobile device, and a video game console.

14. The system of claim 8 wherein the video stream has a frame rate of at least 18 frames per second.

\* \* \* \* \*